(12) United States Patent
How

(10) Patent No.: US 6,479,768 B1
(45) Date of Patent: Nov. 12, 2002

(54) PRECISION DATA ACQUISITION USING MAGNETOMECHANICAL TRANSDUCER

(76) Inventor: Hoton How, 262 Clifton St., Belmont, MA (US) 02478

( * ) Notice: Subject to any disclaimer, the term of this patent is extended or adjusted under 35 U.S.C. 154(b) by 0 days.

(21) Appl. No.: 09/572,900

(22) Filed: May 17, 2000

(51) Int. Cl.$^7$ .................................................. G09G 5/00
(52) U.S. Cl. ........................ 178/19.03; 178/19.01; 178/19.05; 178/19.04; 178/20.01; 345/157; 345/158; 345/159
(58) Field of Search .................... 345/158, 157, 345/179, 159; 178/19.03, 19.04, 19.05, 19.01, 20.01

(56) References Cited

U.S. PATENT DOCUMENTS

| | | | | |
|---|---|---|---|---|
| 5,027,115 A | * | 6/1991 | Sato et al. .................... 341/13 |
| 5,355,100 A | * | 10/1994 | Riggio, Jr. .................. 331/173 |
| 5,371,516 A | * | 12/1994 | Toyoda et al. .............. 345/179 |
| 6,061,177 A | * | 5/2000 | Fujimoto .................... 359/443 |
| 6,297,802 B1 | * | 10/2001 | Fujioka ....................... 345/156 |
| 6,330,359 B1 | * | 12/2001 | Kawabata .................. 382/188 |
| 6,377,249 B1 | * | 4/2002 | Mumford ................... 345/179 |

* cited by examiner

*Primary Examiner*—Richard Hjerpe
*Assistant Examiner*—Abbas Abdulselam

(57) ABSTRACT

Disclosed is a method and a device for obtaining precision data acquisition via hand writing/drawing without requiring the use of a transducer pad, the screen of a monitor, or a scanner. As such, writing/drawing can be applied to almost all kinds of material surfaces, including books, fabrics, labels, etc., with or without showing an ink mark. Graphic and text images can all be effectively processed. Data acquisition function is accomplished by continuously monitoring the orientation of a magnet ball installed at the tip of a magnetomechanical ball-pen device whose outlook resembles a regular pen. When powered by a battery with self data-storage capability, the disclosed method and device allow for a new class of instrumentations that data acquisition function is carried out at the same time whenever hand writing/drawing is applied in the normal manner.

15 Claims, 5 Drawing Sheets

PRECISION DATA ACQUISITION USING MAGNETOMECHANICAL TRANSDUCER

CROSS-REFERENCE TO RELATED APPLICATIONS

Not Applicable

BACKGROUND

1. Field of Invention

This invention is directed to a method and a device for obtaining precision data acquisition using a magnetomechanical transducer. As a direct application, data can thus be acquired using hand writing and drawing applied in a normal manner.

2. Description of Prior Art

Comparing to computer input from a keyboard, it is relatively difficult to input, text data directly from hand writing. Traditional approaches incorporate electrostatic or piezoelectric instruments to be used as the input devices. However, they require special transducer media, in the form of a pad or the screen of a monitor, to be used during the input processes, thereby imposing severe limitations for applications. For example, only a small window compatible to the pad size is available for writing, and the writing is not permanently recorded on paper as a regular pen does with ink. It is not possible to input data at the same time when a notebook/checkbook is written, a special form is filed, an annotation is made at the margin of a book, a piece of lecture notes is taken in the classroom, and a project is planned when lying down on the beach. Apparently, there is a need that text data can be acquired at the same time when hand writing is applied in a normal manner.

At present, although graphic data can be obtained using a scanner, the data itself appear as an optical image whose individual parts or components may not be processed separately. For example, the coordinates of a curve may not readily be visualized from a scanned image. As such, there is a need for direct data input that graphic components or objects are entered from hand drawing. For example, by locating a pen pointer at a special spot on a data curve printed on a magazine page reporting the year-round stock-market values, information associated with that data point is released, revealed on the computer screen in real time. Furthermore, by using a "pen" to input graphic data, not only it gives you the opportunity to physically portray the picture, say, on paper, but also it automatically quantifies the drawn objects allowing you to edit them in the future: modification, duplication, rotation, magnification, coloring, fitting, and smoothing.

Accordingly, it is an objection of the invention to address one or more of the foregoing disadvantages or drawbacks of the prior art, and to provide such improved methods and devices to obtain precision data acquisition for both the text and the graphic data, permitting hand writing/drawing on paper in real time, without requiring the use of a transducer pad, a monitor screen, or a scanner.

Other objects will be apparent to one of ordinary skill, in light of the following disclosure, including the claims.

SUMMARY

In one aspect, the invention provides a method and a device for precision acquisition of text data using hand writing without requiring the use of a transducer pad or the screen of a monitor. As such, text data are acquired at the same time when hand writing is taking place on paper with ink. By using a wordprocessor software, the acquired text data can then be further processed, performing sophisticated tasks such as spelling check, grammar check, e-mail sending, and so forth.

In another aspect, the invention provides a method and a device for precision acquisition of graphic data using hand drawing without requiring the use of a scanner. As such, real-time drawing on paper using a pen with ink is possible, and the drawn objects can then be further processed performing sophisticated tasks such as curve fitting, error estimating, area calculations, and so forth.

In another aspect, the invention provides a method and a device for acquiring hybrid text and graphic data using hand writing and drawing without requiring the use of a pad, a monitor screen, or a scanner. This allows the normal handwriting/drawing action to be integrated with the process of precision data acquisition. When powered by a battery with self data storage capabilities, this invention dictates a new class of instrumentations that a pen-transducer device occupying a minimum volume can be employed in space-limited occasions where a laptop computer finds itself ineffective and awkward in use.

BRIEF DESCRIPTION OF THE DRAWINGS

For a more complete understanding of the nature and objects of the present invention, reference is to be made to the following detailed description and accompanying drawings, which, though not to scale, illustrate the principles of the invention, and in which FIG. 1 shows one example of a magnetomechanical ball-pen device that, when applied in writing, the motion of the pen ball, and hence the trajectory of the pen tip and the scripts of the pen writing, can be characterized by magnetic sensors installed near by.

DETAILED DESCRIPTION

Figure 1:
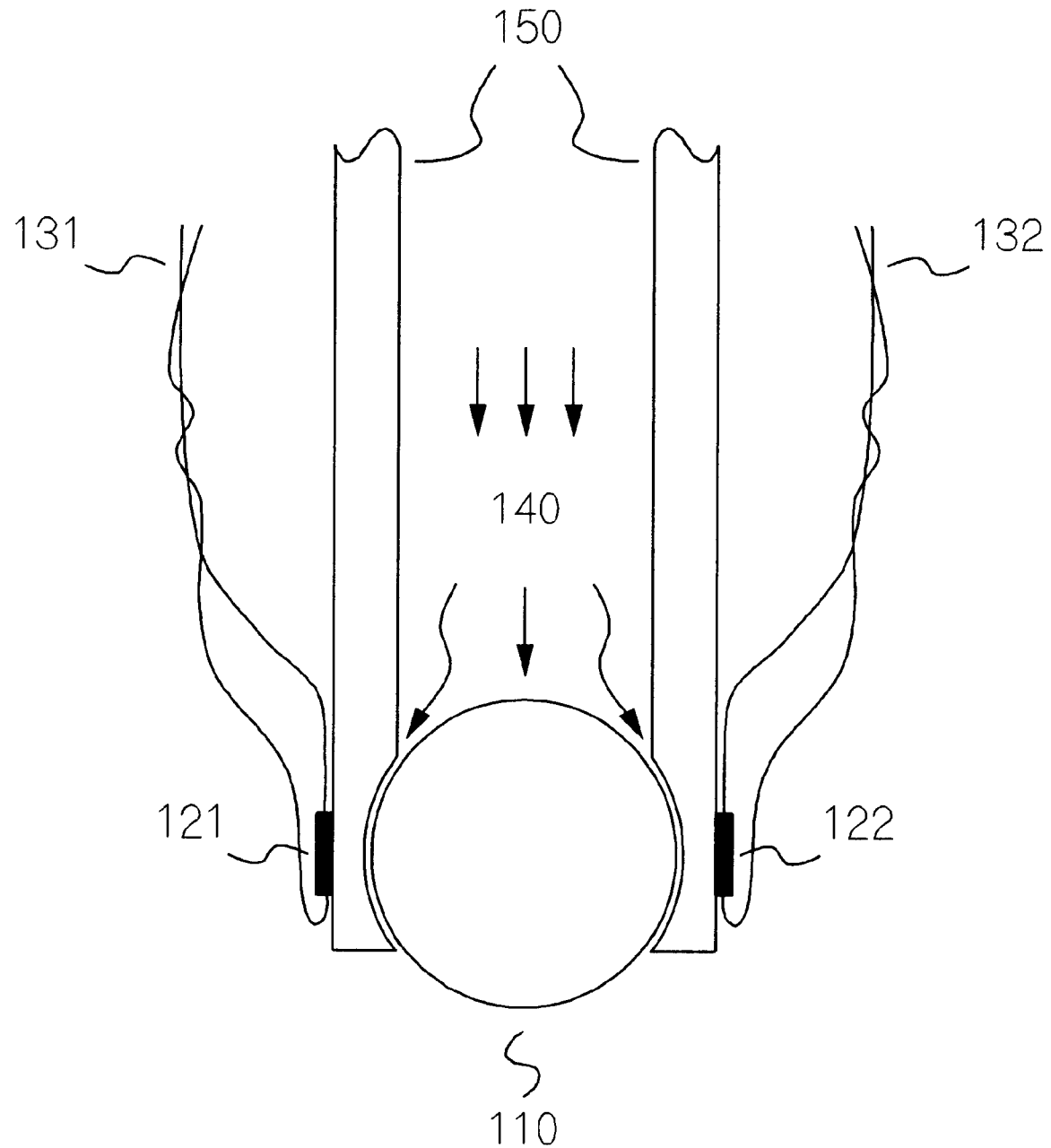

| REFERENCE NUMERALS IN DRAWINGS | |
|---|---|
| 110 | Magnet Ball |
| 121, 122 | Magnetic Sensor |
| 131, 132 | Wiring |
| 140 | Ink |
| 150 | Ink Pipe |
| 201, 202, 203, 204, 205 | Matrix Medium |
| 211, 212, 213, 214, 215, 216, 217, 218, 219 | Hard-Magnetic Medium |
| 221 | Soft-Magnetic Medium |

Magnetomechanical Ball-Pen Construction—FIG. 1

A regular ball pen includes a ball installed at the lower end of an ink pipe. The ball is of a size compatible to the width of the writing strokes. During writing, the ball is placed on top of a two dimensional surface, usually a paper, rolling freely on that surface in response to the writing action. In the mean time, ink is drawn from the ink pipe, flowing across the ball to be deposited on top of the two dimensional surface. As such, ink marks the trajectory of the ball, esteemed as scripts of the writing. If one can specify or describe quantitatively the rolling motion of the ball, these writing scripts are thus recognized.

FIG. 1 shows the aforementioned ball-pen configuration. In FIG. 1 ball 110 is attached at the end of an ink pipe 150. During writing, ball 110 is set on rotational motion, thereby dragging ink 140 to flow across the surface of 110. In order to characterize the rotational motion of 110, 110 is endowed with a unique magnetic moment profile so that different orientations of ball 110 give rise to distinct patterns of magnetic field distribution in the surrounding region. Thus, by probing the magnetic field in the surrounding region near 110, the orientation of 110 is determined. This is demonstrated in FIG. 1 that a set of magnetic probes, 121 and 122, is deployed on the outer surface of the ink pipe 150 close to 110. Wire connections to 121 and 122 are shown in FIG. 1 as 131 and 132, respectively.

Since a rigid-body requires three parameters to describe its rotational motion, known as the Euler's angles, a minimum of three magnetic probes needs to be employed. In fact, four probes are preferred, since one extra probe may be used to characterize the unknown residual field, for example, the earth field. By using the current printing-circuit technologies, these magnetic probes can be fabricated with a miniaturized dimension, in the order of 20~30 $\mu$m, in the form of semiconductor Hall-effect probes, giant magnetoresistance (GMR) probes, and fluxgate probes. All of these magnetic probes have been shown to exhibit a resolution better than $10^{-5}$ Oe, as in contrast to the earth field of about 0.5 Oe.

While detailed construction of ball 110 will be discussed in the following sections, we end this section with an order of estimate about the magnetic field generated by 110. By using permanent magnet of, say, alnico, ball 110 of diameter 1 mm gives rise to a magnetic field in the order of 10 Oe in its surrounding area. By applying a thin coating of a soft magnetic layer, say, permalloy, the resultant magnetic field can even be increased by a factor of 10. To function properly, these probes may require a calibration process each time when the power is turned on.

Figure 2A:
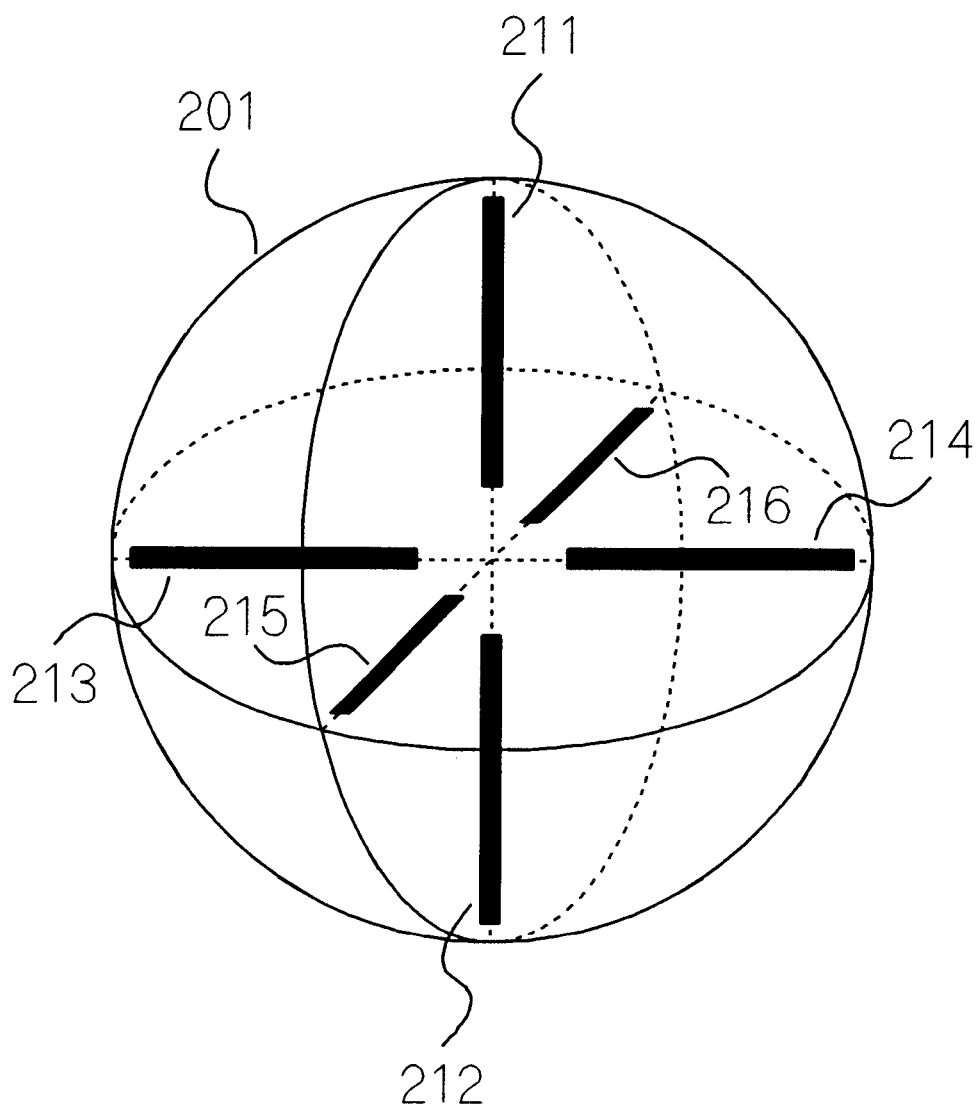
FIG. 2A shows one example of the magnet-ball construction to be included with the magnetomechanical ball-pen illustration of FIG. 1, providing permanent net magnetic moments without showing an axial symmetry.

Magnet-Ball Construction—FIG. 2A

FIG. 2A shows an example how magnet ball 110 of FIG. 1 is constructed. As mentioned previously, ball 110 of FIG. 1A needs to impose a change in the resultant magnetic field distribution whenever the orientation of 110 is altered. As such, a local symmetry axis is not allowed. This is consistent with the magnet ball construction shown in FIG. 2A. In FIG. 2A six permanent magnet bars or wire segments are inserted in the interior of a spherical matrix 201 forming the closure of the magnet ball 110 shown in FIG. 1. By using a laser beam a hole may be drilled down to a diameter of 100 $\mu$m in a depth of 1 mm. In FIG. 2A different number of magnet bars other than six may be assumed, although 6 magnet bars would then require the least complicated program in detection. Arrangement for the polarization of these magnets, 211 to 216, are not important, so long as they can be characterized unambiguously by the detection program. Material for matrix 201 can be magnetic or non-magnetic, as will be determined by the ease of fabrication, as well as cost.

Figure 2B:
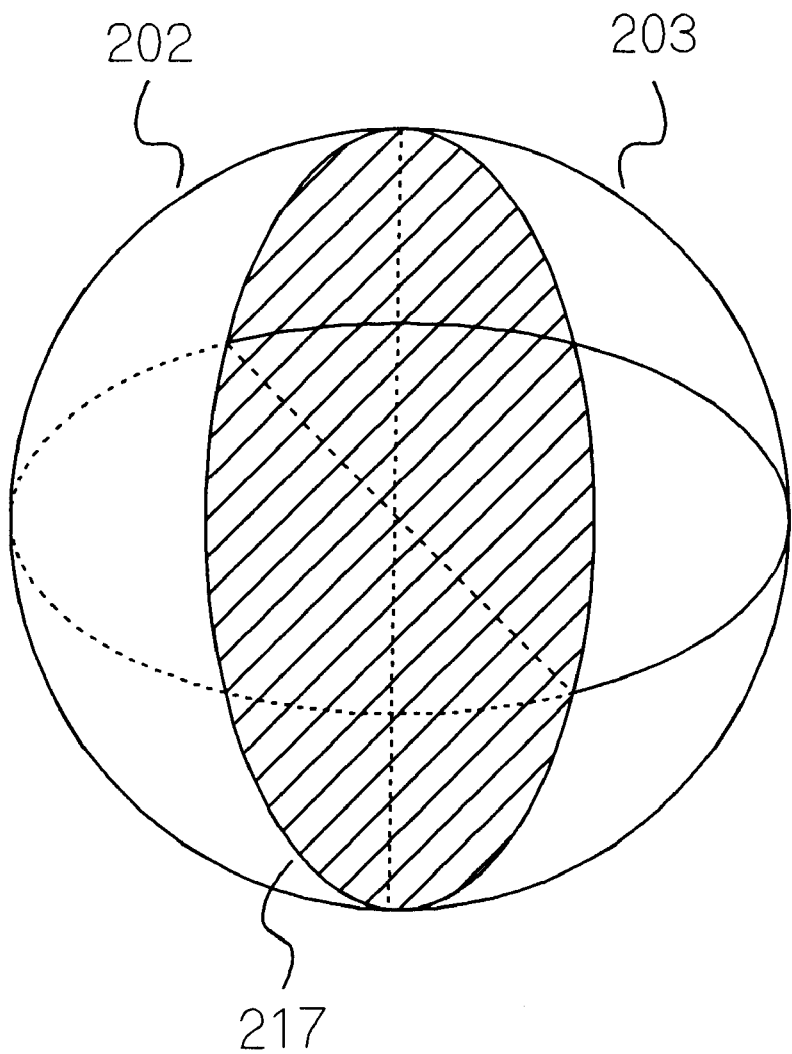
FIG. 2B shows another example of the magnet-ball construction to be included with the magnetomechanical ball-pen illustration of FIG. 1, providing permanent net magnetic moments without showing an axial symmetry.

Magnet-Ball Construction—FIG. 2B

FIG. 2B shows another example how magnet ball 110 of FIG. 1 is constructed. As mentioned previously, ball 110 of FIG. 1A needs to impose a change in the resultant magnetic field distribution whenever the orientation of 110 is altered. As such, a local symmetry axis is not allowed. This is consistent with the magnet ball construction shown in FIG. 2B. In FIG. 2B a permanent magnet disk plate, 217, is sandwiched by two semi-spherical matrices, 202 and 203, forming the closure of the magnet ball 110 shown in FIG. 1. Magnet 217 can also assume other geometries, for example, a rectangular strip, and may not be placed in a meridian plane. Material for matrices 202 and 203 can be magnetic or non-magnetic, as will be determined by the ease of fabrication, as well as cost.

Figure 2C:
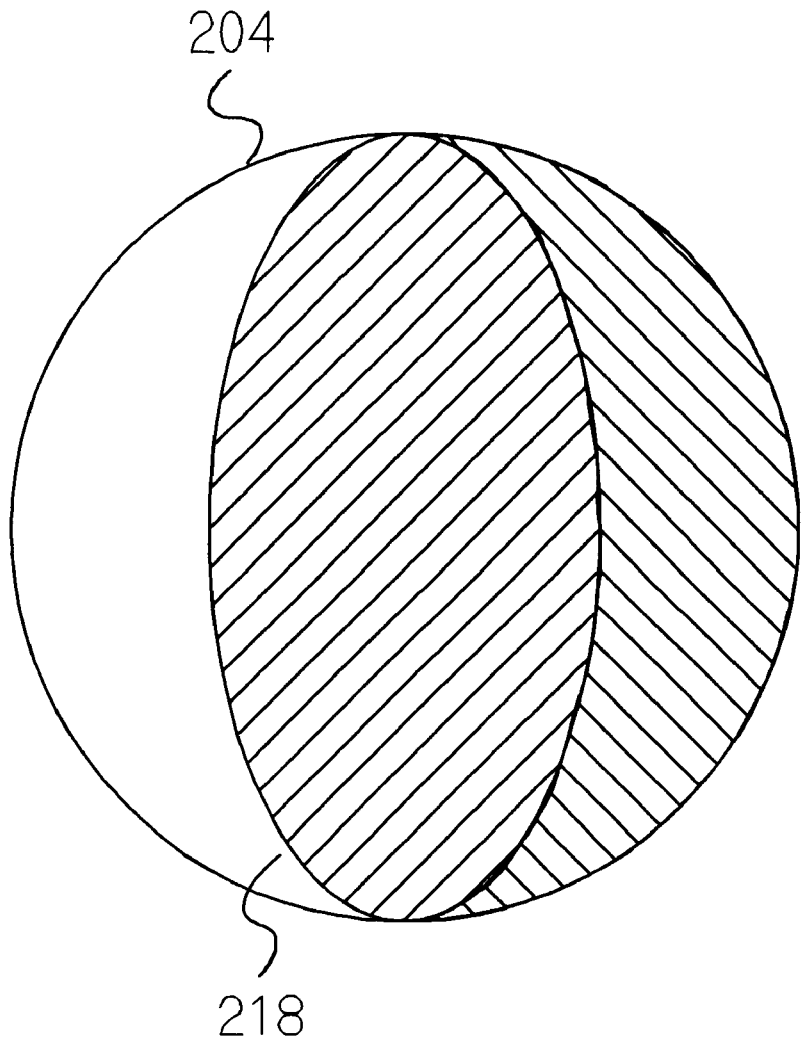
FIG. 2C shows another example of the magnet-ball construction to be included with the magnetomechanical ball-pen illustration of FIG. 1, providing permanent net magnetic moments without showing an axial symmetry.

Magnet-Ball Construction—FIG. 2C

FIG. 2C shows another example how magnet ball 110 of FIG. 1 is constructed. As mentioned previously, ball 110 of FIG. 1A needs to impose a change in the resultant magnetic field distribution whenever the orientation of 110 is altered. As such, a local symmetry axis is not allowed. This is consistent with the magnet ball construction shown in FIG. 2C. In FIG. 2C a semispherical permanent magnet, 218, is glued or attached to a second semi-spherical matrix 204 forming the closure of the magnet ball 110 shown in FIG. 1. Magnet 218 and matrix 204 may assume a different volume ratio other than 1:1. Material for matrix 204 can be magnetic or non-magnetic, as will be determined by the ease of fabrication, as well as cost.

Figure 2D:
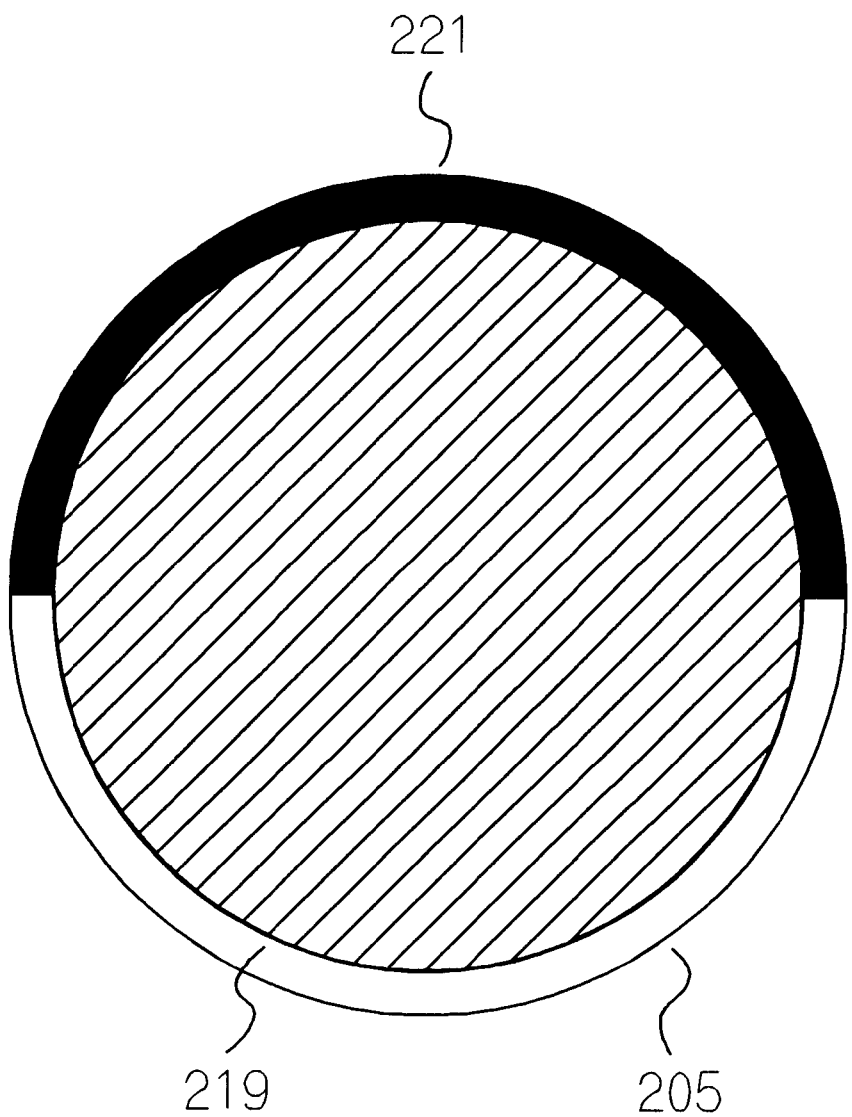
FIG. 2D shows another example of the magnet-ball construction to be included with the magnetomechanical ball-pen illustration of FIG. 1, providing permanent net magnetic moments without showing an axial symmetry.

Magnet-Ball Construction—FIG. 2D

FIG. 2D shows another example how magnet ball 110 of FIG. 1 is constructed. As mentioned previously, ball 110 of FIG. 1A needs to impose a change in the resultant magnetic field distribution whenever the orientation of 110 is altered. As such, a local symmetry axis is not allowed. This is consistent with the magnet ball construction shown in FIG. 2D. In FIG. 2D permanent magnet ball 219 is coated with two kinds of layers, one being magnetic 221, and the other 205 nonmagnetic. Layers 221 and 205 may be allocated with adhesion to the surface of core 219 using a sputtering deposition technique followed by etching, if necessary, and they do not necessarily to assume the same proportion in coverage. Layers 221 and 205 plus core 219 form the closure of the magnet ball 110 shown in FIG. 1. Other arrangements are also possible, for example, 219 being the (soft) magnetic core, and 221 being the (hard) magnetic layer, as determined by the ease of fabrication, as well as cost.

Conclusions

The present invention discloses a method that allows the rotational motion of a magnet ball, displaying permanent magnetic moments without showing a symmetry, to be continuously characterized by a set of magnetic probes installed near by. Thus, by analyzing the measured magnetic fields at the probe positions the orientation of the magnet ball is determined, giving rise to a complete description about the locus of the ball, placed on top of and set to roll on a two dimensional surface. This results in device applications that the magnet ball is installed at the tip of a ball pen so that by monitoring the ball motion the writing scripts are thus recognized.

The present invention discloses a device that a magneto-mechanical ball-pen device is capable of acquiring the data generated by the writing action of the device. In other words, the disclosed magnetomechanical ball-pen device provide dual functions as a writing tool like a regular pen on one hand and a data acquisition device effective for both the graphic data and the text data on the other hand. When texts are encountered, the disclosed magnetomechanical ball-pen device may operate in conjunction with a text recognition software program and an electronic dictionary so as to translate the hand-writing scripts into printing texts. When graphics is encountered, the disclosed magnetomechanical ball-pen device may operate in conjunction with a mouse pointer, which defines the origin for the next stroke of the graphic curve to be generated by the magnetomechanical ball-pen device. Equivalently, the disclosed magnetomechanical ball-pen device can also operate as a mouse pointer, but in a reduced scale. The disclosed magnetomechanical ball-pen device can be configured to acquire the hybrid text and graphic data so that a wordprocessor software program and a graphic drawing tool may be called to achieve optimal performance.

The scope of the invention should be determined by the appended claims and their legal equivalent, rather than by the examples given. It is also understood that the following claims are to cover all generic and specific features of the invention described herein, and all statements of the scope of the invention which, as a matter of language, might be said to fall therebetween.

I claim:

1. A method of continuously characterizing and tracking the motion of the tip of a pen device, comprising:
   A) applying a magnetic ball at said tip of said pen device whose magnetization gives rise to a globally distinguishable field-line pattern in 3D,
   B) employing a plurality of magnetic sensors sufficient in characterizing said globally distinguishable field-line pattern in 3D due to said magnetization of said magnetic ball applied at said tip of said pen device,
   wherein by analyzing the measured data on magnetic fields at said magnetic sensor positions the orientation of said magnetic ball applied at said tip of said pen device is thus determined, thereby providing quantitative information about said motion of said tip of said pen device.

2. The method of claim 1 wherein said magnet ball provides a writing function capable of driving said magnet ball rolling on a two dimensional surface.

3. The method of claim 2 wherein said writing function is accompanied by a flow of ink so that said writing function is recorded with ink marked on said two dimensional surface.

4. The method of claim 1 wherein said quantitative information about said motion of said tip of said pen device enables real-time input of the graphic trajectory data traced out by said tip of said pen device on a two dimensional surface.

5. The method of claim 1 wherein said magnetic sensors include semiconductor Hall-effect probes.

6. The method of claim 1 wherein said magnetic sensors include magneto-resistance-sensitive probes.

7. The method of claim 1 wherein said magnetic sensors include fluxgate probes.

8. The method of claim 1 wherein said magnetic sensors include inductor/transformer probes.

9. A magnetomechanical ball-pen device capable of providing a writing function and a data requisition function at the same time, comprising:
   A) a magnet ball of a predetermined diameter installed at the tip of said magnetomechanical ball-pen device capable of generating a globally distinguishable field-line pattern in 3D,
   B) a plural of magnetic sensors deployed in proximity to said magnet ball sufficient to characterize said globally distinguishable field-line pattern in 3D determining unambiguously the orientation of said magnet ball,
   wherein, when said magnetomechanical ball-pen device is applied in writing causing said magnet ball to roll on a two dimensional surface, said orientation of said magnet ball is continuously monitored by said magnetic sensors, enabling the trajectory of said tip of said magnetomechanical ball-pen device impressed on said two dimensional surface to be recognized, thereby providing quantitative information on said trajectory.

10. The magnetomechanical ball-pen device of claim 9 wherein said writing function involves ink of a predetermined type to flow across said magnet ball, thereby leaving a visible mark on said two dimensional surface.

11. The magnetomechanical ball-pen device of claim 9 wherein said writing function results no visible marks on said two dimensional surface.

12. The magnetomechanical ball-pen device of claim 9 wherein said quantitative information on said trajectory are translated into cursor movement on the screen of a computer.

13. The magnetomechanical ball-pen device of claim 9 wherein said quantitative information on said trajectory contains graphic images.

14. The magnetomechanical ball-pen device of claim 9 wherein said quantitative information on said trajectory are converted into text data via the use of a text recognition software program.

15. The magnetomechanical ball-pen device of claim 9 is self-powered by batteries providing flexibility in use.

* * * * *